(12) United States Patent
Trestain (10) Patent No.: US 10,322,882 B1
(45) Date of Patent: Jun. 18, 2019

(54) PNEUMATIC IMPULSE CONVEYOR WITH RADIAL MOTION BELLOWS DRIVE

(71) Applicant: Pneumatic Innovations, LLC, Millersburg, MI (US)

(72) Inventor: Dennis A. Trestain, Millersburg, MI (US)

( * ) Notice: Subject to any disclaimer, the term of this patent is extended or adjusted under 35 U.S.C. 154(b) by 0 days.

(21) Appl. No.: 15/914,457

(22) Filed: Mar. 7, 2018

(51) Int. Cl.
*B65G 27/04* (2006.01)
*B65G 27/22* (2006.01)
*F01B 19/00* (2006.01)

(52) U.S. Cl.
CPC ............ *B65G 27/22* (2013.01); *B65G 27/04* (2013.01); *F01B 19/00* (2013.01); *B65G 2201/047* (2013.01); *B65G 2812/0316* (2013.01)

(58) Field of Classification Search
CPC ................................ B65G 25/04; B65G 27/22
USPC ................................................ 198/768, 750.7
See application file for complete search history.

(56) References Cited

U.S. PATENT DOCUMENTS

| | | | | |
|---|---|---|---|---|
| 2,600,401 A | * | 6/1952 | Gilbert | F27B 9/2453 198/768 |
| 2,985,281 A | * | 5/1961 | Carrier, Jr. | B65G 27/08 198/756 |
| 6,371,282 B1 | | 4/2002 | Brodin | |
| 6,722,492 B2 | * | 4/2004 | Trestain | B65G 27/22 198/750.8 |
| 6,880,693 B2 | * | 4/2005 | Trestain | B65G 27/22 198/750.8 |
| 6,899,218 B2 | * | 5/2005 | Kwasniewicz | B65G 27/12 198/750.1 |
| 6,988,611 B2 | * | 1/2006 | Kwasniewicz | B65G 25/04 198/750.7 |
| 7,083,042 B2 | * | 8/2006 | Kwasniewicz | B65G 25/04 198/750.1 |
| 7,225,725 B2 | * | 6/2007 | Trestain | B65G 25/04 91/219 |
| RE41,962 E | * | 11/2010 | Trestain | B65G 25/04 198/750.1 |
| RE42,031 E | * | 1/2011 | Trestain | B65G 25/04 198/750.1 |
| 2005/0087427 A1 | * | 4/2005 | Trestain | B65G 27/22 198/768 |

FOREIGN PATENT DOCUMENTS

| | | |
|---|---|---|
| CA | 2313777 C | 1/2001 |
| CA | 2696174 C | 1/2001 |

* cited by examiner

*Primary Examiner* — William R Harp
(74) *Attorney, Agent, or Firm* — Northern Michigan Patent Law, PLC (57) ABSTRACT

A pneumatic impulse conveyor motor using opposed pairs of linear-activated bellows to reciprocate a drive plate. The drive plate is rotatably connected to an array of conveyor trays through a plurality of parallel spaced shafts to convert the linear motion of the bellows to a radial motion useful for reciprocating the array of conveyor trays.

12 Claims, 11 Drawing Sheets

PNEUMATIC IMPULSE CONVEYOR WITH RADIAL MOTION BELLOWS DRIVE

RELATED APPLICATIONS/PRIORITY BENEFIT CLAIM

Not applicable.

FIELD

The subject matter of the present application is in the field of differential impulse conveyors, in particular those using pneumatic motors to reciprocate rigid conveyor trays.

BACKGROUND

Impulse conveyors move rigid conveyor surfaces or "trays" back and forth to incrementally move parts, scrap, and other small items (hereafter parts) forwardly along their length, typically using a speed differential with a slower forward pulse and a faster return pulse. The parts are carried forward by traction with the tray on the slower forward pulse and maintain their forward gain during the return pulse when the tray slides quickly back beneath them.

Examples of such conveyors include those shown in U.S. Pat. No. 6,371,282 to Brodin for a vibrating conveyor with a conveying plate moved back and forth by a horizontal, multi-lobed cam wheel and a pressure spring; and, Canadian Patent CA 2313777 A1 to Tamlin (Mayfran International) for a conveyor drive using a cam driving block or link to impart a reciprocating motion to the tray through a crank shaft with a varying rate of rotation.

U.S. Pat. No. 6,880,693 to Trestain teaches a differential impulse conveyor with a pneumatic conveyor motor, specifically an opposed air bellows motor with a linear motion capable of reciprocating multiple conveyor trays connected through an elongated crossbar. This pneumatic drive motor has proven to be commercially useful, but the present inventor has sought ways to eliminate the damaging effects of leverage force and conveyance inefficiencies caused by offset conveyor trays mounted to a linear motion drive system.

BRIEF SUMMARY

In a first form, the invention comprises an impulse-type air bellows motor for a pneumatic impulse conveyor, the motor having a drive mechanism that converts the reciprocating linear motion of opposed air bellows to a radial lever-type motion that efficiently reciprocates an elongated tray-rocking shaft connected to an array of shaker-type conveyor trays. A single such motor can reciprocate a lengthy array of trays from any mounting position along the length of the array and is immune to binding due to leverage or moment arm effects created through the shaft by the weight of the trays farther from the motor. By eliminating such leverage force, the fluidity of conveyance and efficiency of the conveyor motor are significantly enhanced.

The motor has a swinging drive plate flexibly trapped between one or more pairs of opposing air bellows. The bellows alternately inflate and deflate in opposing linear fashion to push the drive plate back and forth. The drive plate is rotatably suspended in a substantially vertical position on a horizontal drive shaft and automatically adjusts to maintain its vertical position as the drive shaft moves back and forth in a path that produces a radial or arcuate component of movement. The drive shaft is fixed by one or more drive links in spaced, parallel fashion to a horizontal pivot shaft rotating on a fixed pivot axis, and the pivot shaft is fixed by rocker arms in spaced, parallel fashion to a horizontal tray shaft. The drive shaft, pivot shaft, and tray shaft accordingly define a common plane of spaced shafts. The tray shaft is connected to one or more sliding conveyor trays with a rotating connection.

The fixed connection of the drive shaft to the pivot shaft causes the linear inflation action of the flexible bellows on the drive plate to impart a radial motion to the drive shaft and a modified radial or "swinging" motion to the drive plate as the plate is reciprocated. The flexibility of the air bellows' soft, flexible interface with the drive plate accommodates the radial or swinging component of the drive plate's motion along the drive shaft path, and the rotating connection between the drive shaft and drive plate helps keep the drive plate aligned substantially vertically between the bellows throughout its back and forth motion.

In a further form, the invention comprises a two-tier radial motion shaft drive rack for an array of shaker trays. The two-tier shaft drive rack efficiently converts alternating rotational motion of a pivot shaft through a radially spaced tray shaft to impart a substantially linear reciprocation to the shaker trays.

The tray shaft also uses a simple, modular, easily adjusted mounting arrangement for the trays along the length of the tray shaft.

These and other features and advantages of the invention will become apparent from the detailed description below, in light of the accompanying drawings.

DETAILED DESCRIPTION

Figure 1:
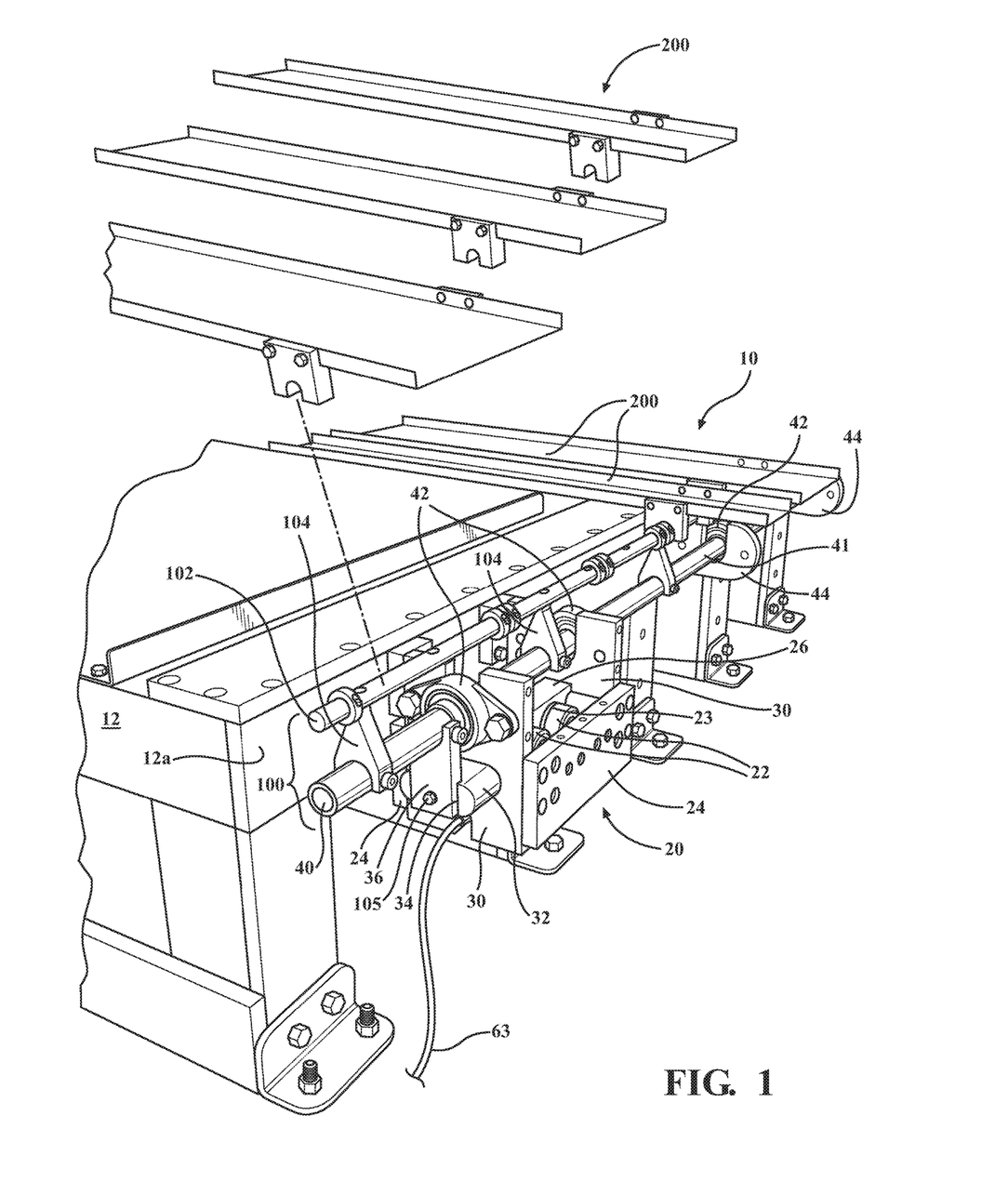
FIG. 1 is a perspective view of an example impulse conveyor according to the invention, with an array of multiple trays driven by an air bellows motor located at one end of the array, and with some of the trays shown exploded from the drive rack.
Figure 2:
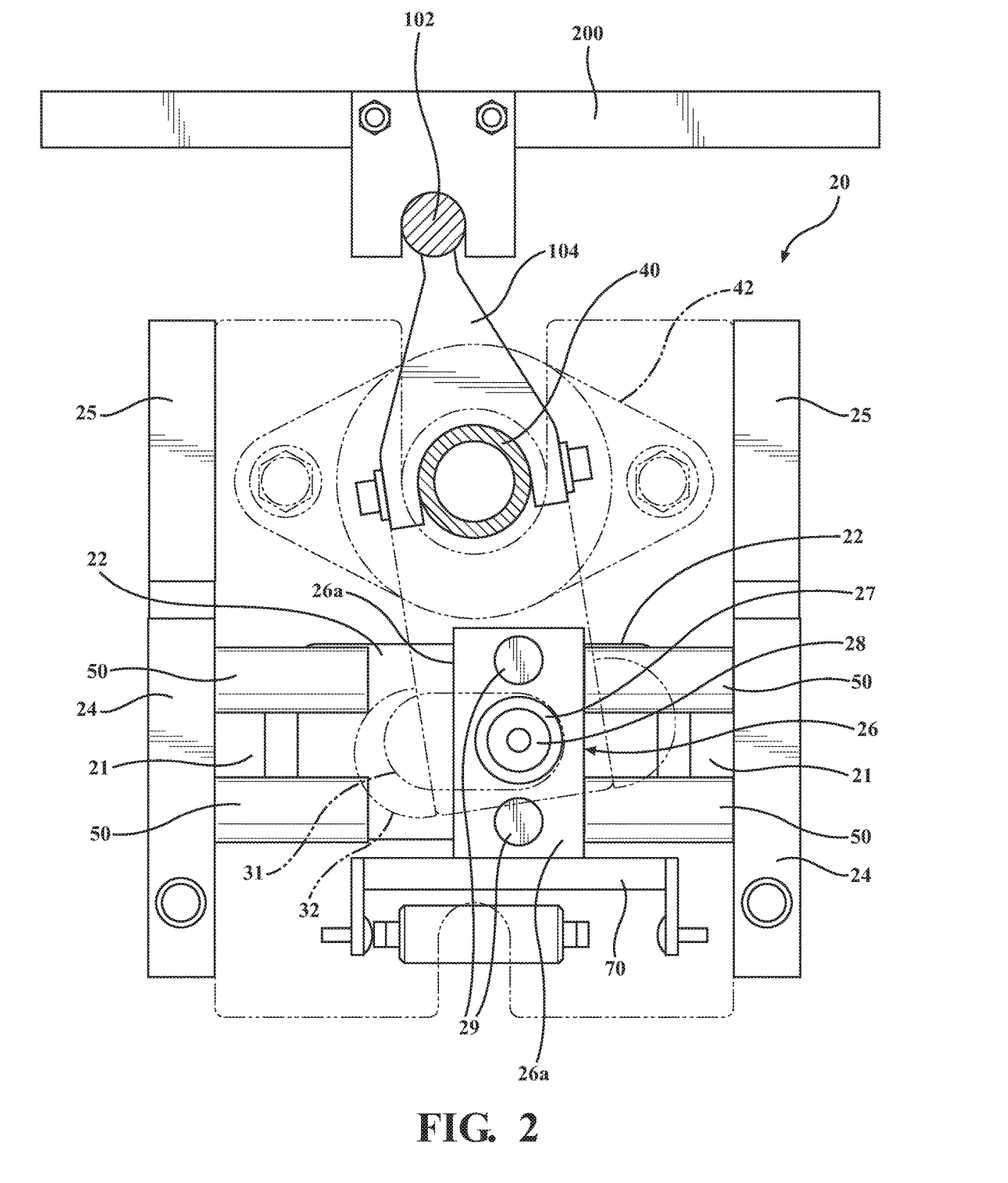
FIG. 2 is a side view of the motor of FIG. 1.
Figure 3:
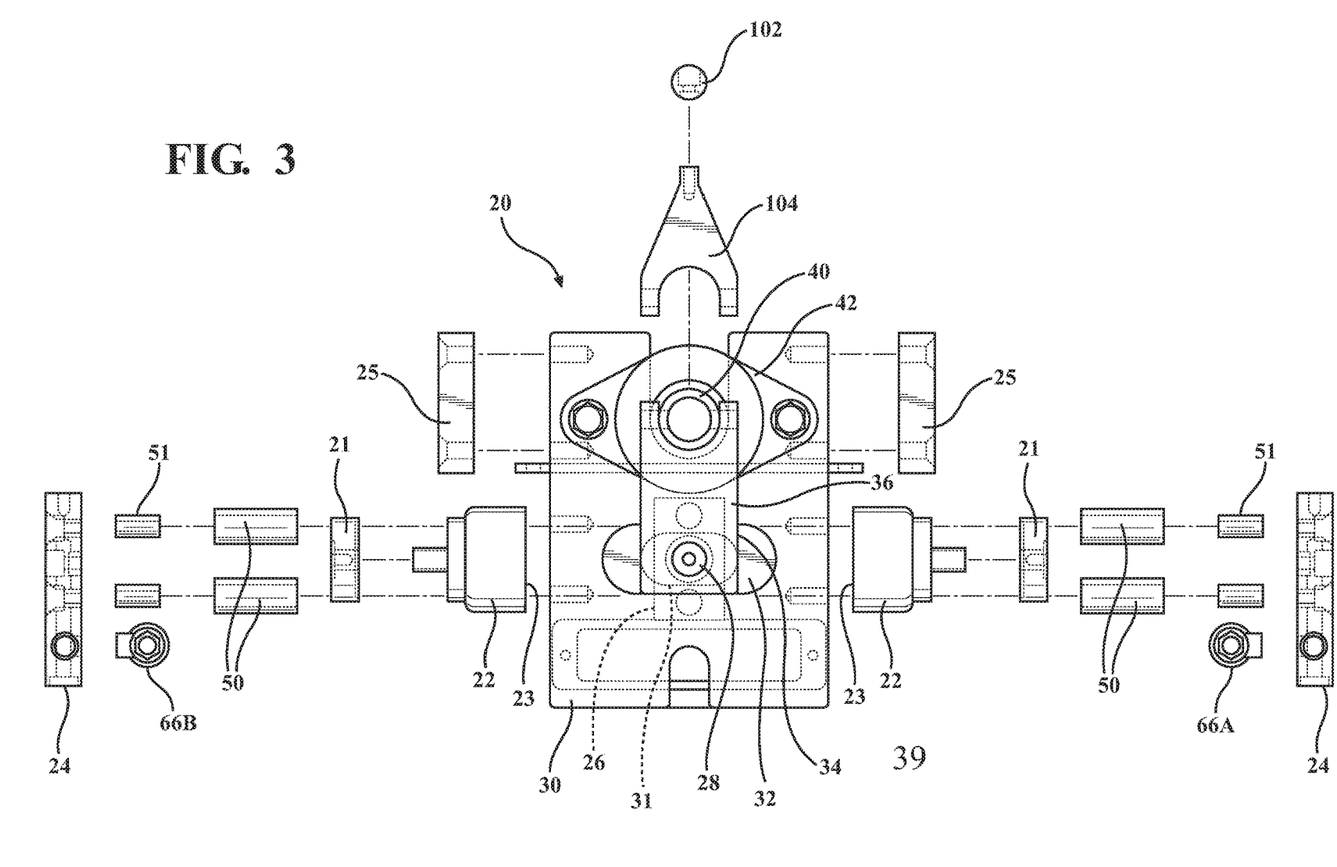
FIG. 3 is an exploded assembly side view of the motor of FIG. 1.
Figure 4:
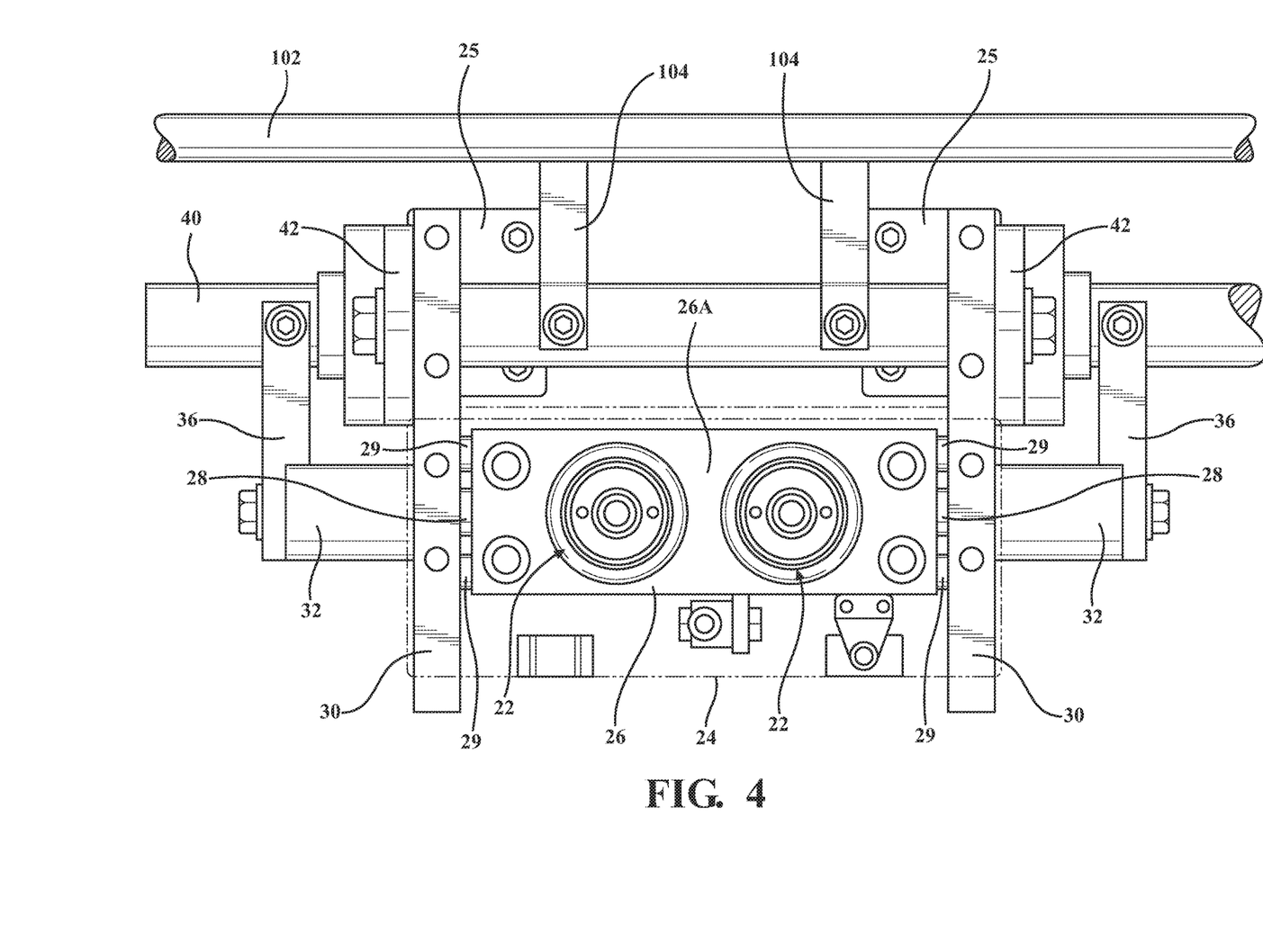
FIG. 4 is a front view of the motor of FIG. 1.
Figure 5:
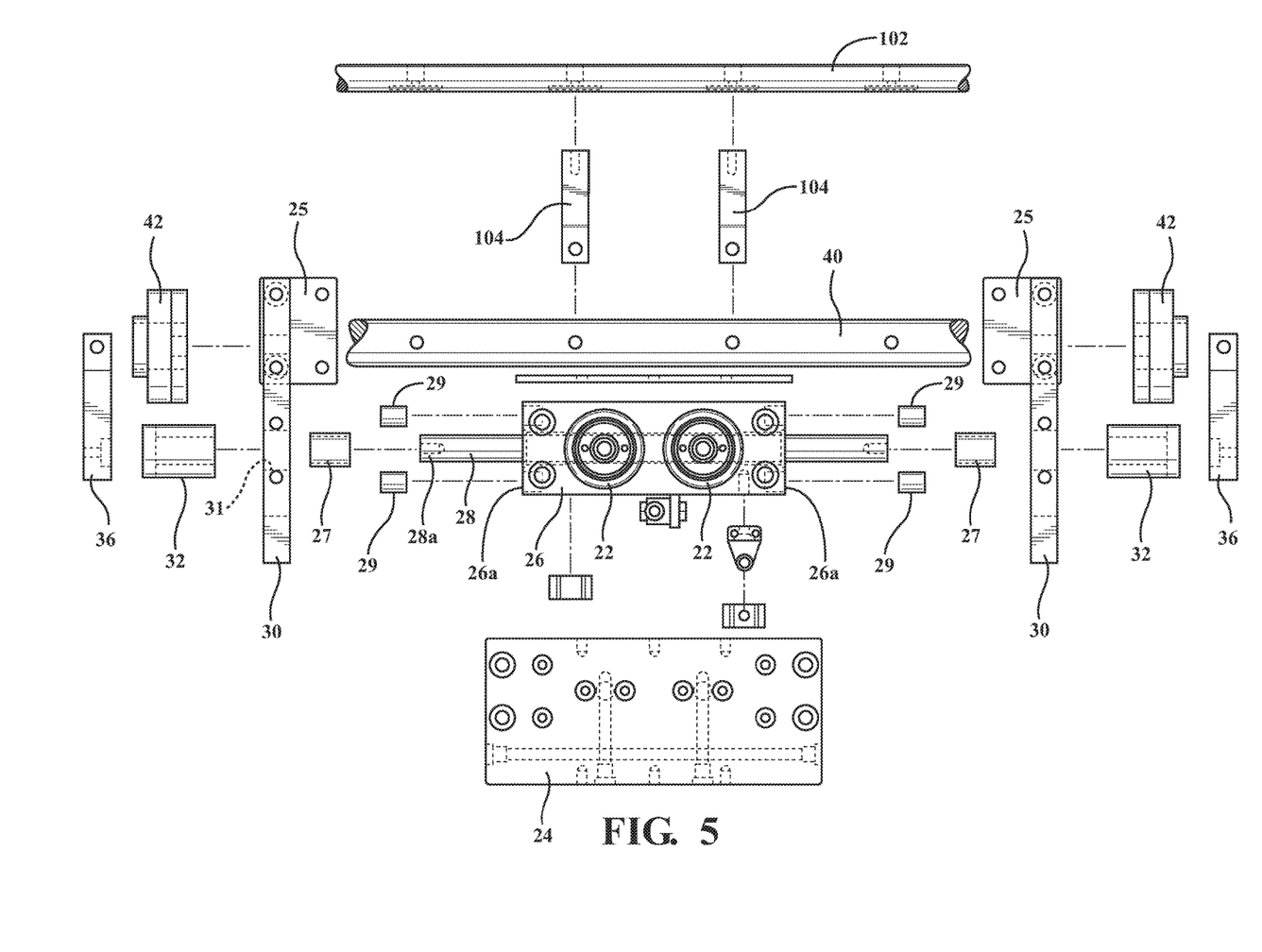
FIG. 5 is an exploded assembly front view of the motor of FIG. 1.
Figure 6:
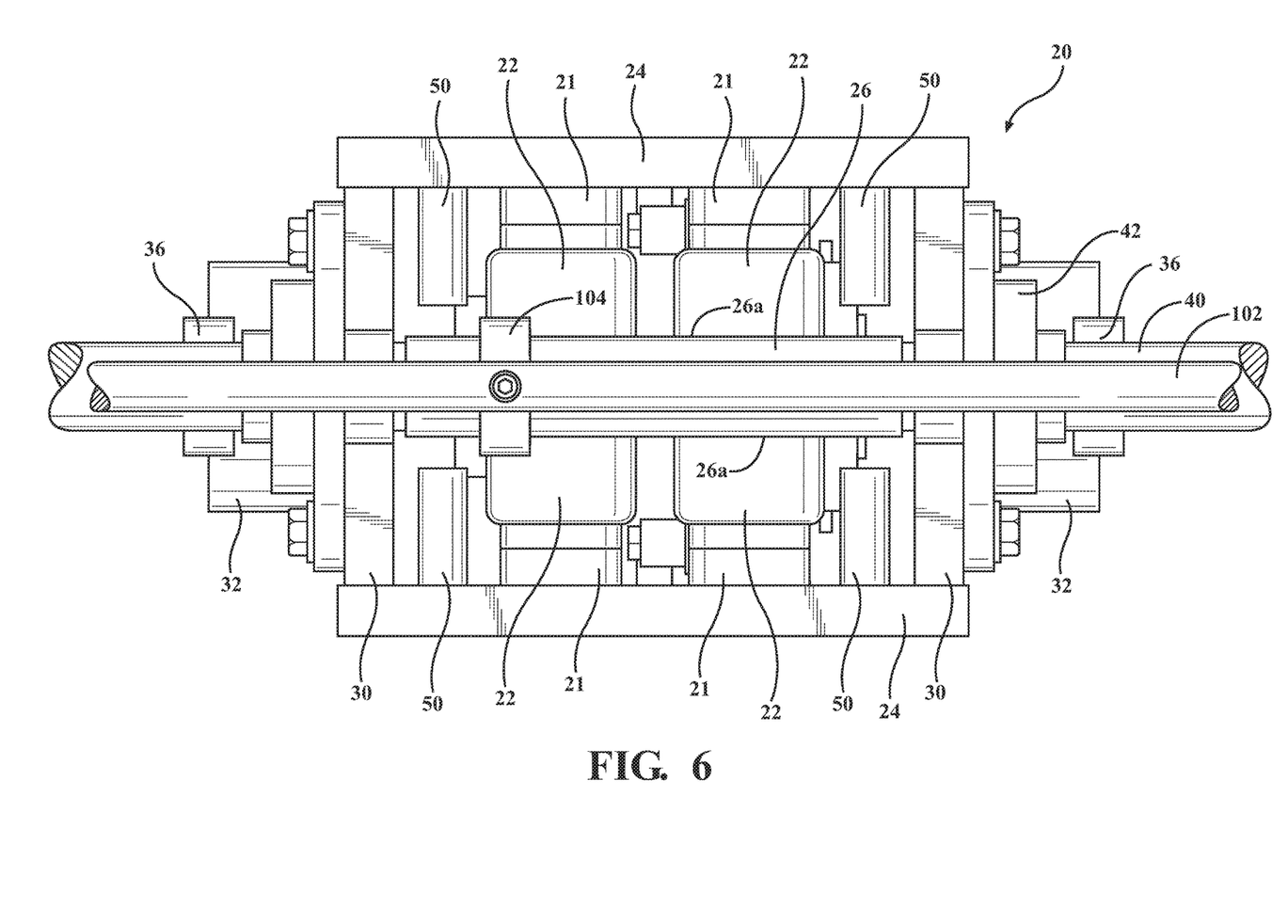
FIG. 6 is a top plan view of the motor of FIG. 1.
Figure 7:
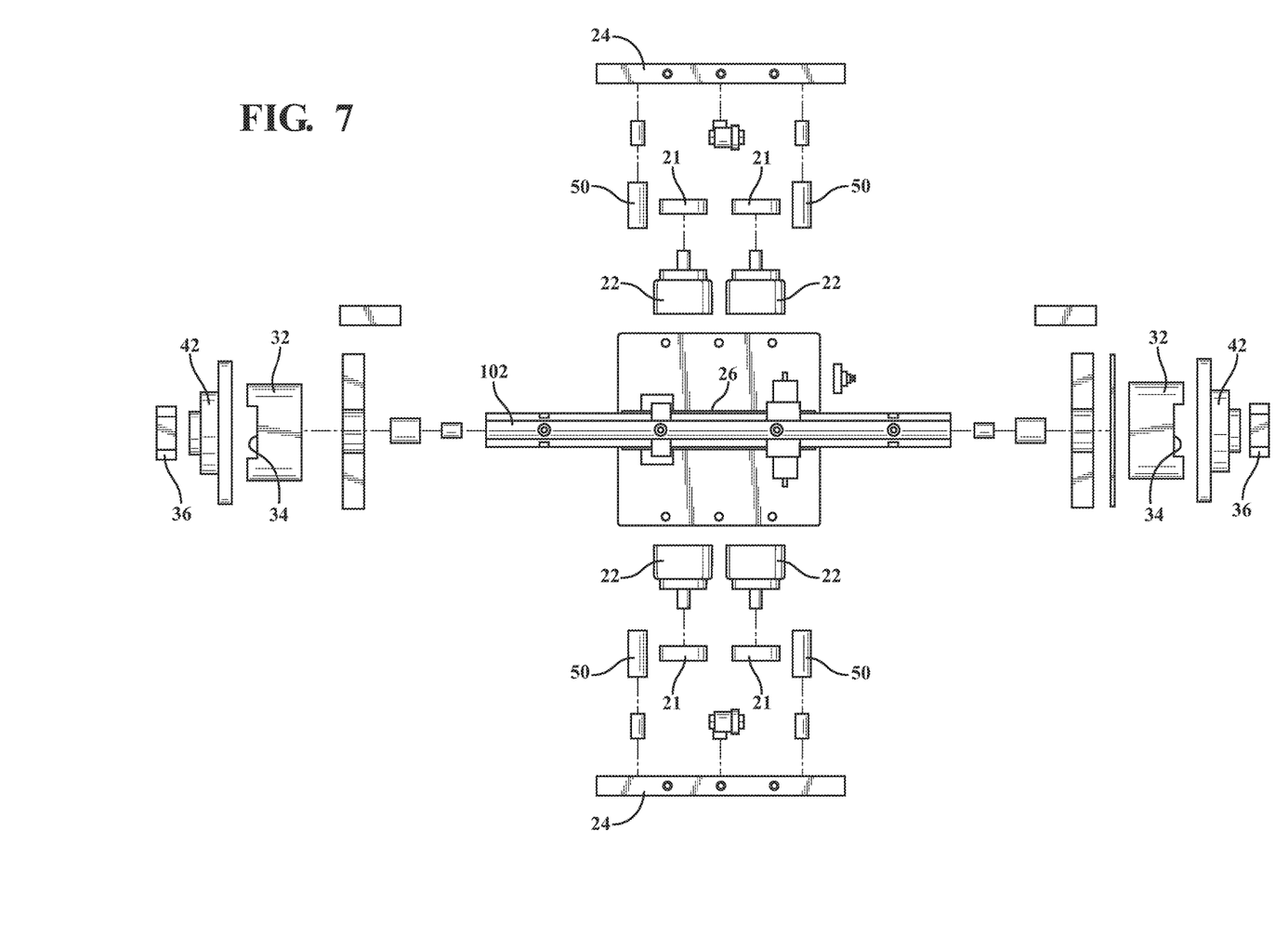
FIG. 7 is an exploded assembly top plan view of the motor of FIG. 1.

Referring first to FIGS. 1 through 3, an impulse conveyor 10 with a motor 20, a drive rack 100, and a plurality of shaker-type conveyor trays 200 is shown in exemplary form in order to teach how to make and use the claimed invention. In general, the rigid parts of the conveyor 10 will be made from durable, wear-resistant materials such as steel and aluminum, with various hard polymers and perhaps other metals used for bearing and wear surfaces, and with softer materials such as rubber and soft polymer equivalents used for pneumatic lines and bellows. Suitable choices for these materials will be known to those skilled in the art.

Conveyor 10 is preferably a differential impulse conveyor, in which the trays 200 reciprocate forwardly at a first slower traction speed and rearwardly at a faster slip speed to incrementally move parts P of known type forwardly to a collection point C. It would also be possible to use the illustrated motor 20 and drive rack 100 to reciprocate trays 200 at equal forward and rearward speeds, if desired, for example if the trays were surfaced with directional friction features not requiring a speed differential to move the parts in one direction.

Motor 20 includes at least one pair of opposing pneumatically-operated bellows 22 of known type, for example similar to those commercially available from Firestone. Bellows 22 are attached to sealable bellow mounting structures 21 which in turn fasten and seal to opposing housing ends 24. The housing ends 24 serve as mounting platforms for bellows 22, bumper stops 50, bumper stop mounts 51 and quick exhaust valves 66A and 66B. The housing ends 24 also serve as manifolds allowing air flow to and from the bellows 22. Each opposing bellows 22 in an aligned pair is alternately inflated with air and deflated in known manner by a pneumatic control circuit 62 (FIG. 9), for example similar to that shown in my U.S. Pat. No. 6,880,693 referenced above (and incorporated herein by reference).

Motor 20 includes at least one pair of attachable mounting plates 25 which allow for securing motor 20 to a sturdy surface for conveying application.

The soft, rubber-like bellows 22 have hard, low-friction ends 23 pressed against the respective vertical front-and-back faces 26a of a rigid vertical drive plate 26 with a flexible self-aligning fit due to the flexible nature of the main body of the bellows. Drive plate 26 is rotatably mounted on a drive shaft 28 in the housing, with the drive shaft connected in parallel to a fixed-axis pivot shaft for radial motion, and with the drive plate having freedom of movement for both back-and-forth linear motion and limited vertical motion so that it the drive plate is capable of a modified radial motion with the radial motion of the drive shaft. This radial motion of the drive plate will be described as a swinging motion as the plate remains in a substantially vertical orientation between the bellows as it moves the drive shaft in an arc, due to the flexible self-aligning fit between the bellows and the faces of the drive plate. While the term "plate" is used to describe drive plate 26, it should be understood broadly enough to include a body of any shape and thickness capable of defining generally vertical front and back bellows-engaging faces and capable of imparting the desired radial lever motion to a pivot shaft via the drive shaft when reciprocated by the linear-action bellows.

Drive shaft 28 passes through bearings 27 seated in the ends of a bore through drive plate 26 allowing for compensational rotation of the drive plate 26 on the drive shaft 28 so that drive plate 26 remains in a vertical position as it swings radially. The ends 28a of drive shaft 28 extend beyond the ends of drive plate 26 into (and preferably through) slots 31 formed in motor housing sides 30. Slots 31 are elongated front-to-back, providing clearance for the drive shaft 28 so that drive shaft 28 may move back and forth in the motor housing sides as bellows 22 alternately push drive plate 26 back and forth between the front and back ends 24 of the motor housing. Drive shaft ends 28a and slots 31 may be covered with caps or guards 32, for example secured to move with the ends of the drive shaft and to slide over the outer faces of motor housing side plates 30 as the drive shaft reciprocates in the motor housing. The ends 26a of drive plate 26 may be evenly spaced from and aligned with the motor housing sides 30 by low-friction spacers 29 secured to the ends of the drive plate and having a sliding fit against the inner faces of the motor housing sides 30.

Slots 3 1define a path that allows a radial or arcuate component of motion to drive shaft 28 as it moves back and forth between the ends of the slots, for example by making the vertical height of the slots greater than the diameter of the drive shaft (as in the illustrated example) so that the drive shaft can move up and down as well as back and forth in the slots. Alternately, slots 31 may be curved to allow a radial component of movement to the drive shaft over its range of travel.

Motor 20 further includes a pivot shaft 40 mounted to rotate in fixed bearings 42 on the motor housing sides 30 in a spaced, parallel relationship to the drive shaft 28. Drive shaft 28 is connected to pivot shaft 40 by a spaced pair of vertical drive links 36 secured at their lower ends to the drive shaft and at their upper ends to the pivot shaft. In the illustrated example, drive shaft caps 32 with slotted ends 34 are engaged with the lower portion of the drive shaft links 36 as they are carried by the drive shaft 28. Drive shaft caps 32 are used to cover slots 31 in housing sides 30 as drive shaft 28 progresses through its reciprocating radial motion. The lower ends of drive links 36 are secured to the ends of drive shaft 28, for example with a bolt connection 105, and the upper ends of vertical drive links 36 are preferably removably secured to pivot shaft 40 with bolts 38 extending through pivot shaft 40 and saddles 39 formed in the upper ends of the drive links 36. The connection between the drive links 36 and the pivot shaft 40 is non-rotating, so that the motion of drive shaft 28 causes pivot shaft 40 to rotate in bearings 42 on a fixed axis. While a pair of spaced drive links is shown and preferred, it would be possible to use other drive link configurations, for example a single drive link between the drive shaft and pivot shaft, or a split drive link connected at two points to the drive shaft and at one or more points to the pivot shaft, or more than two drive links.

It is especially preferred to mount the spaced drive links outwardly of the motor housing, as shown, so that the bellows and motor interior may be covered or enclosed and protected from dirt and debris from the trays and any associated industrial operations. Drive shaft 28 may extend equally outside of the housing sides 30 to set the distance between the vertical drive links 36 at a length that is divisible by the incremental spacing of the drive link connection points formed in the pivot shaft 40. In the illustrated example, the distance between the vertical drive links 36 on motor 20 is 18" (inches) and allows it to be relocated in 6" (inch) increments along the entire length of the pivot shaft 40.

Pivot shaft 40 may extend sufficiently beyond the motor to operate multiple trays 200, as best shown in FIG. 1 and FIGS. 10-12, with motor 20 mounted at one end of the drive rack 100. In the illustrated example, the extended end 41 of pivot shaft 40 is supported on one or more additional bearings 42 secured in flange supports 44 projecting from spaced locations along the front of conveyor 10, for example from a front face 12a of a sturdy, table-like stand 12 or similar machine such as metal stamping press. In the illustrated example the pivot shaft 40 is on the order of 12 (twelve) feet long, supporting twelve separate conveyor trays 200. The length of drive rack 100 and the number of conveyor trays 200 may vary, however, depending on the tray-reciprocating power available from motor 20.

Although the drive plate 26 is trapped between the bellows 22 and thereby limited in range of motion, the drive plate's motion may be more positively limited by sets of rubber bumper stops 50 attached to bumper stop mounts 51 and secured on the inner faces of the motor housing ends 24 adjacent the bellows 22.

As drive plate 26 is reciprocated by the linear back-and-forth motion of the bellows 22, it moves drive shaft 28 with a radial lever motion causing the attached drive shaft links 36 to rotate pivot shaft 40. Pivot shaft 40 in turn reciprocates a tray rocker shaft 102 which is both parallel to and connected to the pivot shaft 40 with a number of equally spaced tray shaft connectors 104.

Figure 8A:
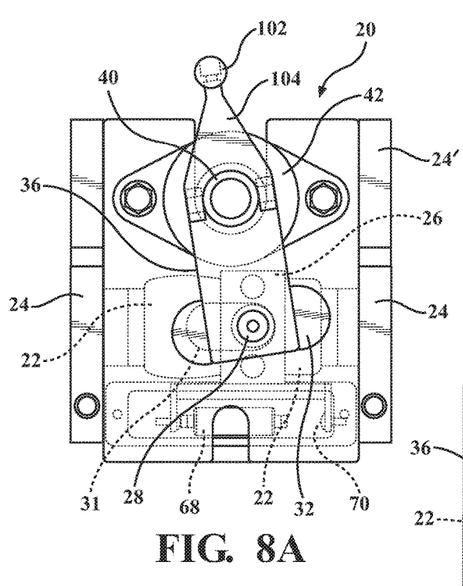
FIGS. 8A-8C are side views of the motor of FIG. 1 at the middle and ends of a cycle, respectively.
Figure 8B:
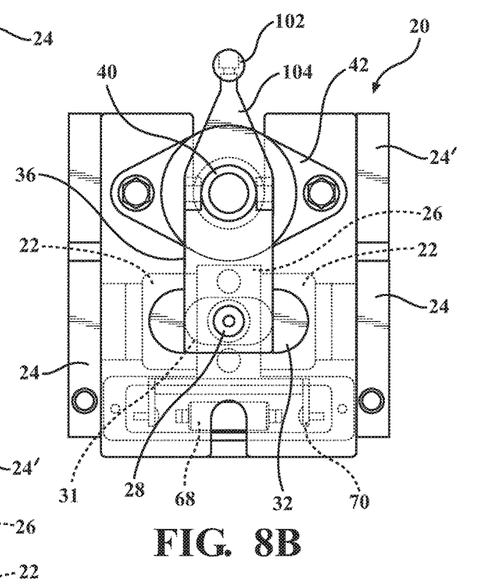
Figure 8C:
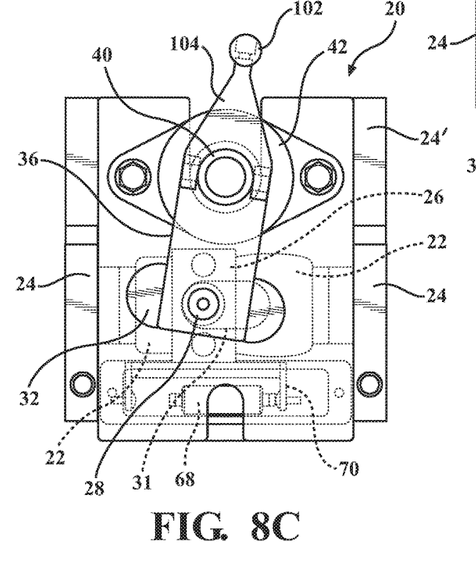

FIGS. 8A-8C illustrate the radial motion progression of the drive plate 26 in response to the alternating bellows inflation/deflation cycle.

In FIG. 8A, drive plate 26 has been moved to the right side of motor 20 via the full inflation of the left side bellows 22 and full deflation of right side bellows 22. As this motion occurs drive shaft 28 and connected drive shaft links 36 impart a turning motion to pivot shaft 40 as they move radially. The turning motion of pivot shaft 40 rotates attached tray shaft connectors 104 and attached tray shaft 102 in the opposite direction of drive plate 26. In this position the tray shaft 102 is at its lowest radial position while drive plate 26 is at its highest radial position.

In FIG. 8B, drive plate 26 has been moved to the center of motor 20 via the partial inflation of right side bellows 22 and partial deflation of left side bellows 22. The imparted turning motion to pivot shaft 40 has moved tray shaft 102 into its highest radial position and drive plate 26 into its lowest radial position.

In FIG. 8C, drive plate 26 has been moved to the left side of motor 20, via the full inflation of the right-side bellows 22 and full deflation of the left side bellows 22. The imparted turning motion to pivot shaft 40 has created the mirror opposite condition to that occurring in FIG. 8A.

Still referring to FIGS. 8A-8C, the substantially linear reciprocating motion of the tray shaft 102 and of its associated tray includes an arcuate or radial component, corresponding to the radial component of the drive shaft motion and the rotation of pivot shaft 40. This motion is described here as substantially linear, however, because the horizontal/linear translation of the tray shaft and tray is substantially greater than the vertical motion imparted during the stroke. For example, if in the illustrated example the forward-backward range of linear reciprocating motion of tray shaft 102 is approximately 1.25" (inches), its vertical rise and fall might be only 0.04" (inches). The vertical component of the motion of tray shaft 102 is intentionally minimized to reduce vertical "jump" of the parts P on the tray relative to their horizontal sliding movement over the tray surface. This substantially linear movement of the tray shaft 102 and tray may be adjusted by adjusting the radial distance of each of the drive shaft 28 and the tray shaft 102 from pivot shaft 40, and preferably by maximizing the distance of the drive shaft 28 and tray shaft 102 from the pivot shaft 40 relative to the tray's desired horizontal motion. It is further preferred but not necessary that the drive shaft 28 and tray shaft 102 be spaced an equal distance from the pivot shaft 40.

Figure 9:
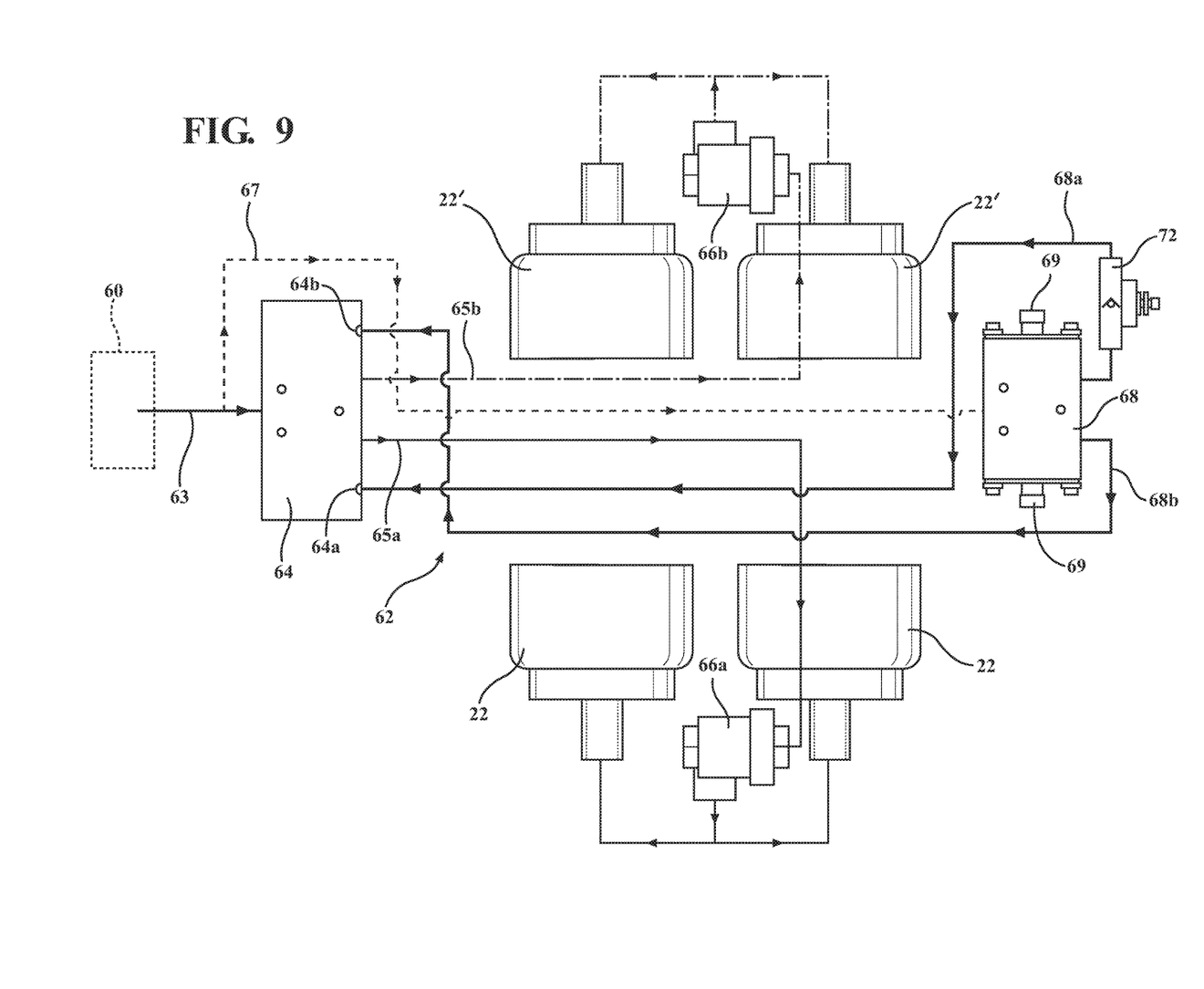
FIG. 9 is a schematic view of a pneumatic control circuit suitable for operating the bellows of the motor of FIG. 1.

Referring to FIG. 9, bellows 22 are operated by a pneumatic supply 60 of known type through a pneumatic circuit 62 comprising valves and switches operatively associated with or mounted on the motor housing. In the illustrated example, pressurized air from pneumatic supply 60 enters two-way main air valve 64 through supply line 63 and is alternately directed to a first-side pair of the bellows 22 through a first feed line 65a and a first-side quick exhaust valve 66a to inflate that pair of bellows 22, and then to a second-side pair of bellows 22' through a second feed line 65b and second-side quick exhaust valve 66b to inflate the second pair of bellows 22 as the first pair of bellows 22 is simultaneously deflated.

A portion of the supply air from supply line 63 is bled through a line 67 to a limit valve 68 to control the switching of air feed direction in the main air valve 64. Limit valve 68 is mounted on or near the motor housing so that a trigger assembly 70 (FIG. 2) connected to and traveling with the drive plate 26 alternately contacts limit switches 69 on the ends of the limit valve 68. Limit valve 68 has a first-side return line 68a connected through a flow control valve 72 to a first valve-switching port 64a on main air valve 64, and a second-side return line 68b connected to a second valve-switching port 64b on main air valve 64. Limit switches 69 control the opening and closing of air flow through the return lines 68a and 68b in known manner through internal valving in the limit valve 68. When return air from limit valve 68 is received from the return lines at the respective valve-switching ports 64a, 64b of the main air valve 64, the internal valving in the main air valve is operated in known manner to switch the flow of feed air from one feed line 65a, 65b to the other.

As the first pair of bellows 22 on one side of the motor 20 is inflated with incoming air through the respective exhaust valve 66a, the second pair of bellows 22 on the other side of motor 20 is deflated through a check valve or equivalent exhaust port in the respective exhaust valve 66b as feed air from main valve 64 through the respective feed line 65b is terminated. When the first pair of bellows 22 is fully inflated, forcing drive plate 26 to its limit of motion in the inflation direction, limit valve 68 switches the direction of air feed so that the second pair of bellows 22 on the opposite side of motor 20 is inflated and the first pair of bellows is deflated/exhausted through its exhaust valve 66a.

Where a differential impulse is desired, as in the illustrated example, one of the return lines 68a or 68b associated with the forward or rearward motion of the conveyor trays 200 is connected to main air valve 64 through an adjustable flow control valve 72. Flow control valve 72 adjusts the speed at which the limit valve 68 shifts directional air supply between the opposing pairs of bellows 22 in known manner, creating an adjustable-length pause between direction changes in the motor's stroke that promotes the conveyance of material along the trays.

It should be understood that various valves and switching mechanisms for the pneumatic control circuit 62 schematically illustrated in the example above are readily available and/or readily programmable and adjustable by those skilled in the art of pneumatic controls to achieve the desired control over bellows 22. It should also be understood that alternate valving, limit, and switching arrangements could be used to alternately inflate and deflate the opposing bellows 22 at the desired rate.

Figure 10:
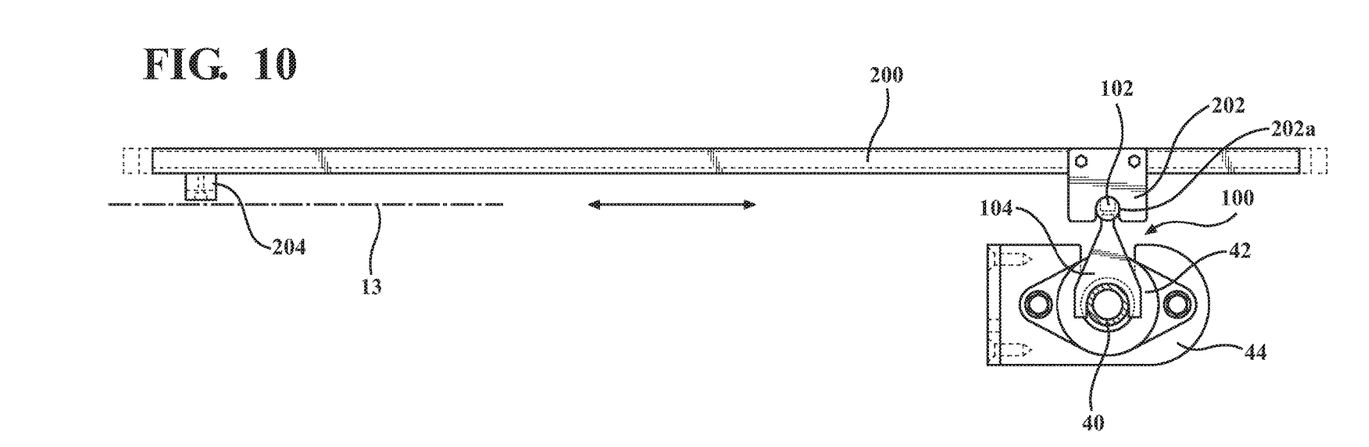
FIG. 10 is a side view of the drive rack and tray portion of the conveyor of FIG. 1 and its connection to a tray.
Figure 11:
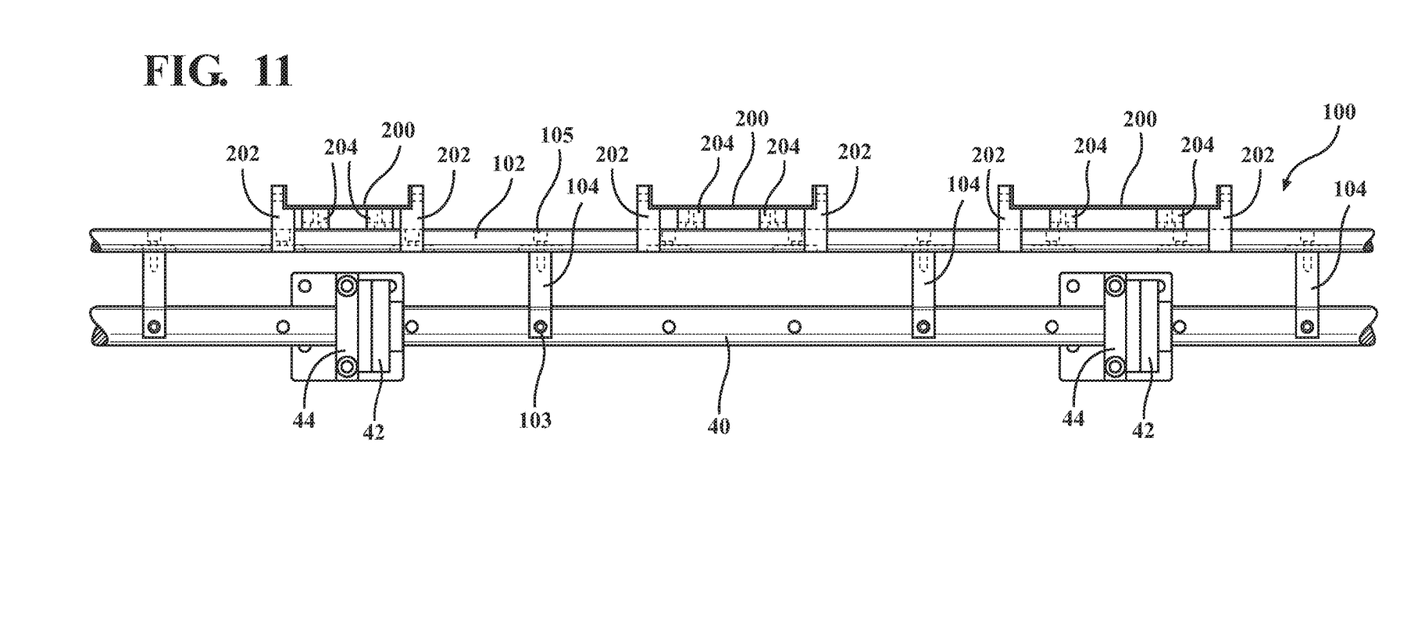
FIG. 11 is a front view of the drive rack and tray portion of the conveyor of FIG. 1.
Figure 12:
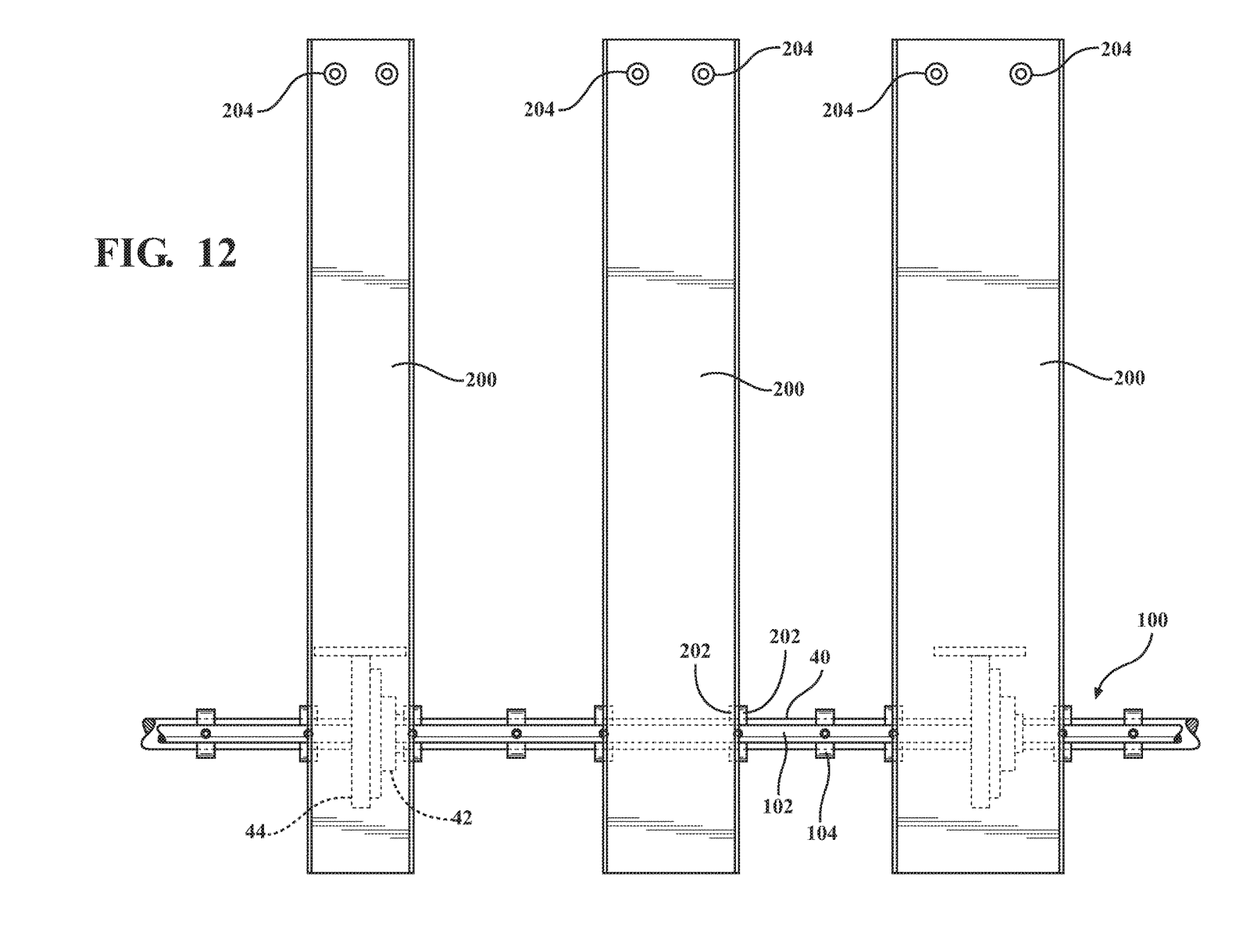
FIG. 12 is a top plan view of the drive rack and tray portion of the conveyor of FIG. 1.

FIGS. 10-12 show details of drive rack 100 and its two-tier shaft structure, comprising pivot shaft 40 and tray shaft 102. Tray shaft 102 is connected to pivot shaft 40 in a parallel and spaced relationship by a plurality of vertical tray shaft connectors 104 spaced along the length of drive rack 100. Tray shaft connectors 104 are rigid, preferably precisely machined metal "towers", and are secured in non-rotating fashion to pivot shaft 40 at one end and secured to tray shaft 102 at the other end, for example with bolt connections 103, 105, so that rotation of the pivot shaft translates directly to a substantially linear reciprocating motion of tray shaft 102 over the relatively short stroke of each cycle. The length of drive rack 100 is supported along the conveyor machine 10 by the plurality of spaced pivot shaft bearings 42 on bearing flanges 44 secured to the face of the machine. Both the pivot shaft 40 and the tray shaft 102 may be provided with extra sets of aligned shaft mounting connection points 103, 105 as illustrated, so that any number of tray shaft connectors 104 may be added, removed, or moved to different locations along the shafts with bolts or other suitable mechanical connectors.

Connecting the tray shaft to the pivot shaft with multiple, evenly-spaced tray shaft connectors 104 along the full length of the shafts is important for preventing torsional bending of the shafts. Further, making the tray shaft connectors removable and providing multiple aligned connection points for the connectors along the tray shaft and pivot shaft allows the motor to be re-positioned anywhere along the face of the conveyor, with a corresponding re-positioning of the tray shaft connectors.

Trays 200 are removably and rotatably connected to tray shaft 102 and carried back and forth by the tray shaft 102 with a rotatable connection between them. In the illustrated example trays 200 are connected to tray shaft 102 by tray mounts 202, comprising spaced pairs of nylon or similar hard polymer bearing plates secured to the sides of the trays 200. Tray mounts 202 have aligned, rounded, generally U-shaped notches 202a corresponding to the diameter of the tray shaft so that they can simply be dropped in place on the shaft for operative engagement. The notches 202a have smooth surfaces that rotatably ride on the polished surface of tray shaft 102 as the shaft reciprocates to move the trays 200 back and forth. The opposite ends of illustrated trays 200 have sliding bearing surfaces or wear pads 204 configured to level the rear ends of the trays 200 and to ride smoothly back and forth on a rail, bed, or similar flat guide surface 13 on the conveyor stand 12.

The drop-on, lift-off engagement of trays 200 with tray shaft 102 makes it easy to add, remove, and rearrange the desired number of trays along the conveyor, since they may be placed at virtually any location along the tray shaft 102. While side-mounted rotatable bearing plates with open-ended, rounded bearing notches are illustrated as the preferred form of rotatable connection between trays 200 with tray shaft 102, other forms and mounting locations for the rotatable connection can be used.

It will finally be understood that the disclosed embodiments represent presently preferred examples of how to make and use the invention but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been used to describe new and useful improvements in science and the useful arts. The scope of the invention should accordingly be construed by what the above disclosure teaches and suggests to those skilled in the art, and by any claims that the above disclosure supports in this application or in any other application claiming priority to this application.

What is claimed is:

1. A motor for a pneumatic impulse conveyor, the motor comprising:
   a housing;
   a pair of opposed pneumatic bellows in the housing configured to be alternately inflated and deflated in a linear direction;
   a drive plate trapped between the opposed pneumatic bellows with a flexible fit, the drive plate configured to be reciprocated back and forth in the housing between the opposed pneumatic bellows as they alternately inflate and deflate;
   a drive shaft rotatably connected to the drive plate and movable with the drive plate in the housing along a reciprocating path with a radial motion;
   a pivot shaft rotatably connected to the housing on a fixed rotational axis spaced from and parallel to the drive shaft, the pivot shaft connected to the drive shaft by one or more drive links non-rotatably connected to the pivot shaft; and,
   a tray shaft configured to be connected to move one or more conveyor trays, the tray shaft spaced from and parallel to the pivot shaft oppositely of the drive shaft, the tray shaft connected to the pivot shaft by a plurality of spaced connectors non-rotatably connected to the pivot shaft.

2. The impulse conveyor motor of claim 1, wherein the drive shaft and the tray shaft are spaced equidistant from the pivot shaft.

3. The impulse conveyor motor of claim 1, wherein the pivot shaft and the tray shaft each have a length greater than a length of the drive shaft.

4. The impulse conveyor motor of claim 3, wherein the pivot shaft and the tray shaft extend from one side of the motor housing a distance greater than on an opposite side of the motor housing.

5. The impulse conveyor motor of claim 1, wherein the motor housing comprises two sides spaced from and located on opposite ends of the drive plate, and further wherein the motor housing sides comprise slots in which respective ends of the drive shaft are located for greater movement in the linear direction and lesser movement in a vertical direction to define a radial motion path.

6. The impulse conveyor motor of claim 1, wherein the drive plate moves radially as it reciprocates in the linear direction between the opposed pneumatic bellows.

7. The impulse conveyor motor of claim 6, wherein the drive plate is held substantially vertically between the opposed pneumatic bellows as it moves radially.

8. The impulse conveyor of claim 1, wherein the one or more drive links comprise a plurality of spaced drive links located outwardly of the motor housing.

9. The impulse conveyor of claim 1, wherein the tray shaft connectors are removably connected to aligned mounting locations on the tray shaft and the pivot shaft so as to be re-positionable along the tray shaft and the pivot shaft.

10. A pneumatic impulse conveyor comprising:
    a pneumatic motor with a housing;
    a pair of opposed pneumatic bellows in the housing configured to be alternately inflated and deflated in a linear direction;
    a drive plate trapped between the opposed pneumatic bellows with a flexible fit, the drive plate configured to be reciprocated back and forth in the housing between the opposed pneumatic bellows as they alternately inflate and deflate;

a drive shaft rotatably connected to the drive plate and movable with the drive plate in the housing along a reciprocating path with a radial motion;

a pivot shaft rotatably secured to the housing on a fixed rotational axis spaced from and parallel to the drive shaft, the pivot shaft connected to the drive shaft by one or more drive links secured in non-rotating fashion to the pivot shaft; and, a tray shaft connected to move a conveyor tray, the tray shaft spaced from and parallel to the pivot shaft oppositely of the drive shaft, the tray shaft connected to the pivot shaft by a plurality of spaced connectors non-rotatably connected to the pivot shaft, the tray shaft further rotatably connected to the conveyor tray.

11. The pneumatic impulse conveyor of claim 10, wherein the tray shaft is connected to the conveyor tray through a bearing plate secured to the tray, the bearing plate comprising an open-ended notch on a lower end thereof, the open-ended notch having a diameter corresponding to a diameter of the tray shaft and configured to rest on the tray shaft with a rotating fit therebetween.

12. A motor for a pneumatic impulse conveyor, the motor comprising:

an opposed pair of linear-activated pneumatic bellows configured to be alternately inflated and deflated in a linear direction;

a substantially vertical drive plate trapped between the bellows with a flexible fit to be reciprocated by the bellows in the linear direction with freedom of movement for a radial motion component while remaining substantially vertical, the drive plate rotatably connected to an array of conveyor trays through a first one of a plurality of connected parallel spaced horizontal shafts rotating about a common pivot axis to convert the linear direction inflation and deflation of the bellows to a radial motion to reciprocate the array of conveyor trays in a substantially linear manner through a second one of the plurality of connected parallel spaced horizontal shafts.

* * * * *